United States Patent Office 2,714,619
Patented Aug. 2, 1955

2,714,619

PROCESS FOR POLYMERIZING 1,3-DIHALOOLEFINS

Arnold H. Anderegg and Donald S. Melstrom, Houston, Tex., assignors to Shell Development Company, Emeryville, Calif., a corporation of Delaware No Drawing. Application July 25, 1951,
Serial No. 238,580

4 Claims. (Cl. 260—654)

This invention relates to a process for the production of low molecular weight polymers, especially dimers and trimers, from compounds of the type of 1,3-dichloropropene and its homologs.

Processes for the polymerization of 1,3-dichloropropene are known. However, such processes are characterized by a low conversion of the monomer and by a relatively low yield, in terms of the amount of monomer converted, of the desired low molecular weight dimer and trimer products. Of these products, those having the dimer structure are particularly useful as chemical intermediates, and it would be desirable if a process were available which would not only provide these low molecular weight products in good yield, with little losses to higher molecular weight materials, but which would also increase the proportion of the starting material which is converted to the dimer products, and it is an object of the present invention to provide such a process.

The olefinic dihalides used in the process of this invention have the following structure:

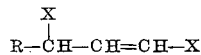

in which the X's represent halogen atoms (preferably chlorine) and R represents a hydrogen atom, or an alkyl, aryl, alkaryl or aralkyl radical which can be substituted with a group such as hydroxy, amino, alkyl, or the like which does not otherwise interfere with the desired reaction. Preferably, however, R, when not a hydrogen atom, is a hydrocarbon radical. Representative reactants, any one of which can be employed in the process of the invention are, for example, 1,3-dichloropropene, 1,3-dibromopropene, 1,3-diiodopropene, 1,3-dichlorobutene-1, 1,3-dichlorobutene-2, 1,3-dichloropentene-1, 1,3-dichloro-3-phenylpropene, 1,3-dichloro-4-phenylpentene-1, 1,3-dibromopentene-1, 1-chloro-3-bromopentene-1, 1,3-dichloro-4-tolylbutene-1, 1,3-dibromo-3-xylylpropene, 1,3-dichloro-3-(p-aminophenyl)propene, 1,3-dichloro-4-(p-hydroxyphenyl)butene-1 and 1,3-dibromo-4-phenylpentene-1.

It has been found that when one or more dihalo-olefinic reactants of the foregoing variety are maintained at a temperature between about 10 and 50° C. in the presence of a Friedel-Crafts catalyst added in solution form to the reactant material, a high percentage of the latter is converted to the corresponding dimer and trimer compositions, and very little thereof is lost to products of higher molecular weight. Further, the ratio of the dimer to the trimer product in the resulting reaction mixture is good. These dimer and trimer products are useful in a wide variety of applications, they, and many of the products prepared therefrom, having valuable insecticidal, fungicidal and nematicidal properties, and also having utility as plasticizers and softeners for various resin and rubber compositions. Thus, the products prepared by chlorination of the dimer and trimer compositions (hexachlorohexane and octachlorononane) have valuable fire retardant properties, and the lactones, as beta-dichloromethyl-gamma-butyrolactone, prepared by the oxidation and dehydrochlorination of the dimers are especially valuable insecticidal and fungicidal compositions. These products are also employed as intermediates in various other organic syntheses, as in those procedures involving the cross-linking of other compounds where the dimer is used with particularly good effect.

As noted above, a catalyst of the type used in the Friedel-Crafts syntheses is employed in the process of this invention. Representative catalysts falling into this group are aluminum chloride, aluminum bromide, aluminum iodide, boron trifluoride, stannic chloride, ferric chloride and the like, and any one or more of the catalysts of this type can be used. These catalysts are added to the reaction mixture in the form of a solution in a solvent of the type which is substantially inert under the conditions employed in the reaction. Representative solvents falling into this category are nitromethane, ethyl chloride, dioxane, ethyl ether, ethyl alcohol, isopropyl alcohol and the like, the particular solvent chosen being one having the requisite solubility for the catalyst employed. Aluminum chloride is the preferred catalyst for use in the process of the present invention, and particularly good results have been obtained when the aluminum chloride is employed in the form of a solution in nitromethane.

In carrying out the reaction leading to the formation of the dimer and trimer products, the desired dihalo-olefinic reactant (in the liquid condition and in the substantial absence of water) is placed in a suitable reaction vessel, preferably arranged to be stirred and cooled and equipped to receive the catalyst solution. If desired, the reaction vessel may also contain a suitable solvent or diluent for the dihalo-olefinic reactant, though preferably no diluent other than that utilized to dissolve the catalyst is employed. After the liquid reactant has been brought to the desired temperature within the range of from about 10 to 50° C., the catalyst is added to the reaction liquid, preferably as the latter is stirred. The resulting polymerization reaction is exothermic in character, and it has been found that the temperature in the reaction mixture can be readily controlled at the desired level provided the rate of catalyst addition is not too rapid. Preferably, the latter rate is so adjusted as to avoid a temperature rise of more than about 10° C. in the cooled solution, and good results have been obtained by slowly adding the catalyst solution to the cooled reaction mixture over a period of from about 5 to 60 minutes. Once all the catalyst has been added, the reaction mixture is preferably maintained within the temperature range of from about 10 to 50° C. for another period of at least 30 minutes. Good results have been obtained with total reaction periods of from about 1 to 8 hours.

The amount of catalyst to be employed is not critical and will vary depending on the nature of the reactants and the conditions of the reaction, as well as with different catalysts. In general, good results are obtained by using from about 0.05 to 10% of catalyst, based on the weight of dihalo-olefinic reactant employed, and a preferred catalyst range is from about 0.5 to 5%. The catalyst solution employed can vary in strength over a relatively wide range, though good results have been obtained with solutions containing from about 15 to 75% of the catalyst.

The reaction is conducted at either atmospheric, subatmospheric, or superatmospheric pressures, though, in general, atmospheric pressures are preferred.

While the present invention is usually practiced with but a single dihalo reactant, it is also possible to employ mixtures of two or more of these reactants. In this manner it is possible to obtain reaction products containing a variety of mixed dimer and trimer compositions, many of which can be used with good effect as plasticizers and softeners for various resin compositions, among other applications.

The desired dimer and trimer reaction products can be recovered from the reaction mixture by a practice of known separation procedures. As a general rule, the reaction mixtures contain a substantial quantity of the unreacted dihalo-olefinic starting material, and this fraction is normally distilled from the reaction mixture, at either normal or reduced pressures, before the other components of the mixture are isolated by distillation, selective dissolution, or other processes.

The process of the invention is illustrated in various of its embodiments by the following examples:

EXAMPLE I (A) In this operation 250 grams of 1,3-dichloropropene were introduced into a flask equipped with a stirrer and a funnel for adding the catalyst solution. The temperature of the liquid reactant was adjusted to 30° C., whereupon a catalyst solution prepared by dissolving 5 grams of aluminum chloride in a like amount of nitromethane was added dropwise to the stirred reaction mixture over a period of about 30 minutes. During this period of catalyst addition, the reaction temperature was maintained in about the range 30° C. to ±5° C. by cooling the flask externally. Once the addition of catalyst was complete, the contents of the flask were stirred for an additional period of 3.5 hours at 30° C., following which the mixture was poured over crushed ice.

(B) In a companion operation conducted using solid aluminum chloride, 250 grams of 1,3-dichloropropene were introduced into a flask and there maintained within the range of about 30 to 35° C. as 5 grams of solid aluminum chloride were added portionwise to the stirred solution over a period of 2 hours and 50 minutes. The reaction mixture was then maintained at 30° C. for an additional period of 1 hour and 10 minutes, following which the mixture was poured over crushed ice.

The reaction mixtures obtained in (A) and (B) above, on being separated from the aqueous layer, were distilled through a Vigreux Column under reduced pressures. After the unconverted 1,3-dichloropropene had been distilled off, the pressure was reduced to 3 mm. and a fraction distilling between 80 and 83° C. was recovered. This fraction, which represented the dimer (believed to have the formula

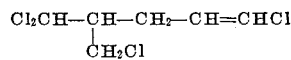

was a water-white liquid having a refractive index ($n20/D$) of 1.5130, and a density ($d\ 25/25$) of 1.3739. Distillation was then discontinued and the residue was extracted with isopropanol. The isopropanol extract was maintained at —15° C., thereby causing the separation of a black, viscous material composed of polymers of higher molecular weight than the trimer. On separating the isopropanol layer from the deposited polymer, the solution was diluted with water to precipitate the dissolved trimer, and the latter was then heated on a steam bath under reduced pressure to remove water and isopropanol. There remained, as the 1,3-dichloropropene trimer, an odorless, light amber-colored viscous liquid having a refractive index ($n20/D$) of 1.5330. The amount of the 1,3-dichloropropene starting material recovered as the unconverted monomer, and the amount of the converted portion going to dimer, trimer and higher polymers (as well as the amount of reactant unaccounted for) in the foregoing operations, is presented in the table which follows Example III.

EXAMPLE II (A) This operation was conducted under the same conditions as described in Example I (A) above, except that here there was employed 3% of the AlCl₃ catalyst (50% sol. in CH₃NO₂) based on the weight of the dichloropropene reactant, instead of 2%.

(B) This operation duplicated that described in Example I (B) above, but again with 3% of solid AlCl₃ being employed instead of 2%.

EXAMPLE III

This operation was also conducted in the same manner as that described in Example I (A) above, except that here the temperature was maintained at —10° C. ±3° C., 4% of AlCl₃ (50% sol. in CH₃NO₂) instead of 2% was employed, and the reaction period was reduced to 3 hours. As indicated by the data presented in the table, even at —10° C. the proportion of reactant converted to the dimer, as compared with that going to the trimer, remains high, though the over-all conversion of the 1,3-dichloropropene starting material is lower than would otherwise be desirable.

*Polymerization of 1,3-Dichloropropene (DCP)*

| Example | AlCl₃ (Percent Based on DCP) | CH₃NO₂ (Percent Based on DCP) | Temp., °C. | Time, Hrs. | DCP Recovered as Unconverted Monomer, Percent | Yield Percent (Based on Converted DCP Feed Portion) | | | |
|---|---|---|---|---|---|---|---|---|---|
| | | | | | | Dimer | Trimer | Higher Polymers | Unaccounted for |
| I (A) | 2 | 2 | 30 | 4 | 26 | 42 | 40 | 16 | 2 |
| I (B) | 2 | | 30 | 4 | 9 | 30 | 32 | 32 | 6 |
| II (A) | 3 | 3 | 30 | 4 | 12 | 36 | 42 | 20 | 2 |
| II (B) | 3 | | 30 | 4 | 4 | 20 | 29 | 46 | 5 |
| III | 4 | 4 | —10 | 3 | 57 | 73 | 22 | 4 | 1 |

The invention claimed is:

1. The process for the production of dimers and trimers of 1,3-dichloropropene which comprises, bringing 1,3-dichloropropene into direct contact with a catalyst solution consisting essentially of aluminum chloride dissolved in nitromethane in the liquid phase, and at a temperature in the range of from about —10° C. to about 50° C.

2. The process for the production of dimers and trimers of 1,3-dichloropropene which comprises, bringing 1,3-dichloropropene into direct contact, in the liquid phase, at a temperature in the range of from about —10° C. to about 50° C., with a liquid catalyst solution consisting essentially of a solution of aluminum chloride in nitromethane, said catalyst solution containing from about 15 to about 75% by weight of aluminum chloride, and said solution being added to said 1,3-dichloropropene in an amount resulting in a mixture having an aluminum chloride content equal to from about 0.05 to about 10% by weight of the 1,3-dichloropropene charged.

3. The process in accordance with claim 2 wherein said catalyst solution contains about 50% by weight of aluminum chloride, and said catalyst solution is added to said 1,3-dichloropropene in an amount resulting in the obtaining of a mixture having an aluminum chloride content equal to from about 0.5 to about 5% by weight of the 1,3-dichloropropene charged.

4. The process in accordance with claim 2 wherein said catalyst solution contains about 50% by weight of aluminum chloride, said catalyst solution is combined with said 1,3-dichloropropene in an amount to obtain a mixture containing aluminum chloride in an amount equal to from about 0.5 to about 5% by weight of the 1,3-dichloropropene charged, and said 1,3-dichloropropene is maintained in direct contact with said catalyst solution for a period of time in the range of from about 1 to about 8 hours.

References Cited in the file of this patent

UNITED STATES PATENTS

| | | |
|---|---|---|
| 1,998,309 | Clark et al. | Apr. 16, 1935 |
| 2,301,952 | Jacobi et al. | Nov. 17, 1942 |
| 2,571,883 | Hulse | Oct. 16, 1951 |

FOREIGN PATENTS

| | | |
|---|---|---|
| 774,693 | France | Sept. 24, 1934 |

OTHER REFERENCES

Prins, "Rec. des Trav. Chim. des Pays-Bas," vol. 68, pages 217–9 (1949).